United States Patent
Holzapfel et al.

(10) Patent No.: US 6,526,190 B2
(45) Date of Patent: Feb. 25, 2003

(54) POSITION MEASURING SYSTEM

(75) Inventors: Wolfgang Holzapfel, Obing (DE); Siegfried Reichhuber, Stein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/993,944

(22) Filed: Nov. 14, 2001

(65) Prior Publication Data

US 2002/0076129 A1 Jun. 20, 2002

(30) Foreign Application Priority Data

Nov. 17, 2000 (DE) .......................... 100 58 239

(51) Int. Cl.⁷ ............................................... G02B 6/00
(52) U.S. Cl. ............................ 385/12; 385/10; 385/33; 385/36; 356/499; 356/618; 250/237 G; 250/231.16
(58) Field of Search .......................... 385/12, 10, 33, 385/34, 35, 36, 37; 250/237 G, 231.13, 231.14, 231.16; 356/482, 499, 618, 619, 620, 73.1

(56) References Cited

U.S. PATENT DOCUMENTS

| | | | |
|---|---|---|---|
| 4,923,300 A | 5/1990 | Michel et al. | 356/482 |
| 4,938,595 A | 7/1990 | Parriaux et al. | 356/482 |
| 5,001,340 A | 3/1991 | Schwefel et al. | 250/231.16 |
| 5,113,066 A | 5/1992 | Michel et al. | 250/205 |
| 5,162,869 A | 11/1992 | Michel et al. | 356/345 |
| 5,271,078 A | 12/1993 | Franz et al. | 385/37 |
| 5,424,833 A | 6/1995 | Huber et al. | 385/37 |
| 5,493,397 A | 2/1996 | Huber et al. | 356/482 |
| 5,498,870 A | 3/1996 | Ishizuka | 250/237 G |
| 5,500,734 A | 3/1996 | Spanner | 385/12 X |
| 5,977,539 A | * 11/1999 | Holzapfel et al. | 250/237 G |
| 5,994,692 A | 11/1999 | Holzapfel | 250/237 G |
| 6,198,534 B1 | * 3/2001 | Hofer et al. | 250/237 G |
| 6,429,940 B1 | * 8/2002 | Willhelm | 356/499 |

FOREIGN PATENT DOCUMENTS

| | | |
|---|---|---|
| EP | 0 426 882 | 5/1991 |
| EP | 0 589 477 | 3/1994 |
| EP | 0 735 346 | 10/1996 |

OTHER PUBLICATIONS

Alfons Ernst, "Digitale Längen– und Winkelmesstechnik" [Digital Linear and Angular Measuring Technology], published by Dr. Johannes Heidenhain GmbH, 1998, pp. 16–27.

R.M. Pettigrew, "Analysis of Grating Imaging and its Application to Displacement Metrology," SPIE, vol. 136, 1st European Congress on Optics Applied to Metrology, 1977, pp. 325–333.

* cited by examiner

*Primary Examiner*—Phan T. H. Palmer
(74) *Attorney, Agent, or Firm*—Brinks Hofer Gilson & Lione

(57) ABSTRACT

A position measuring system that includes a graduation support having a measuring graduation, a planar waveguide and a light source that generates light that is conducted to the measuring graduation, wherein the light is reflected at surfaces of the planar waveguide. A scanning unit for scanning the measuring graduation that includes a light-sensitive scanning area to which light modulated by the measuring graduation is conducted. The modulated light conducted to the light-sensitive scanning area has at least two different light portions, which differ in a number of reflections at the surfaces of the planar waveguide, and wherein the reflecting of the at least two different light portions occurs prior to reaching the measuring graduation.

30 Claims, 4 Drawing Sheets

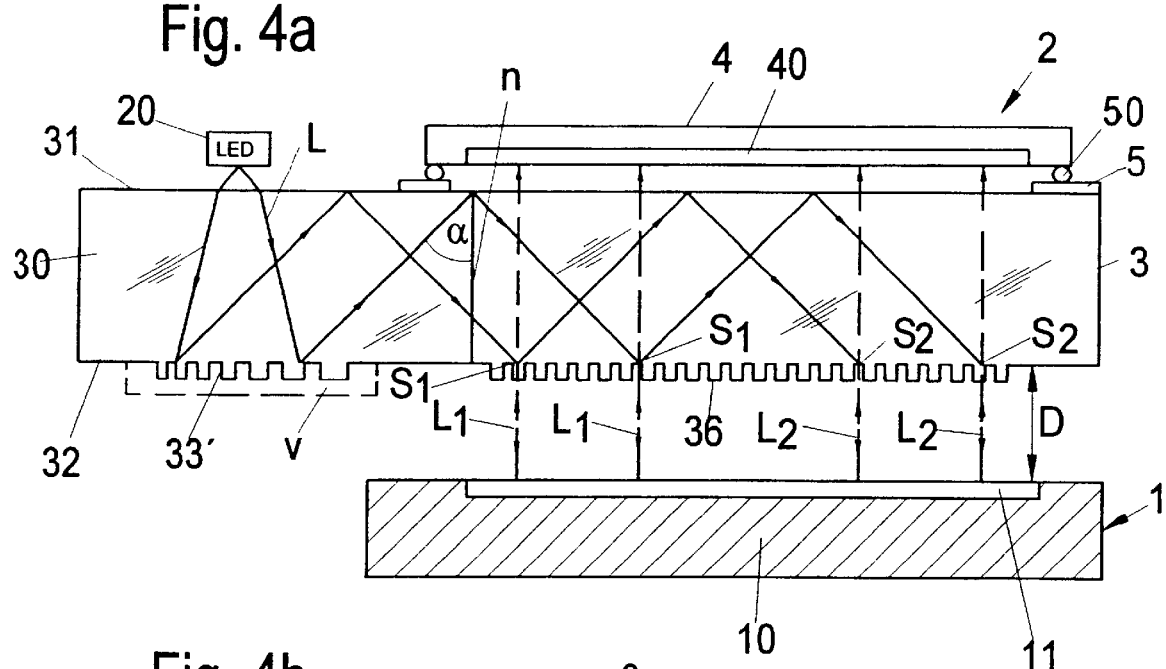
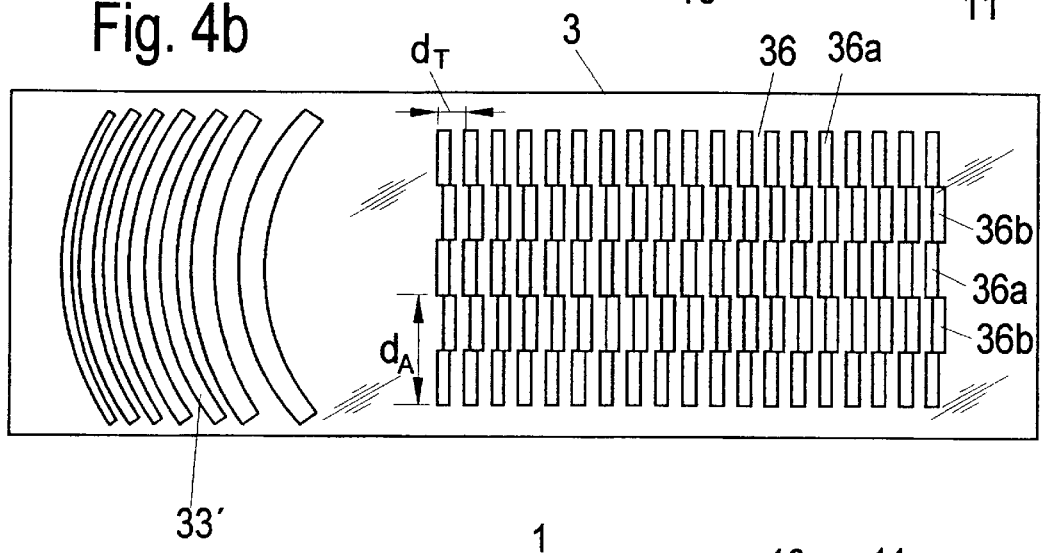
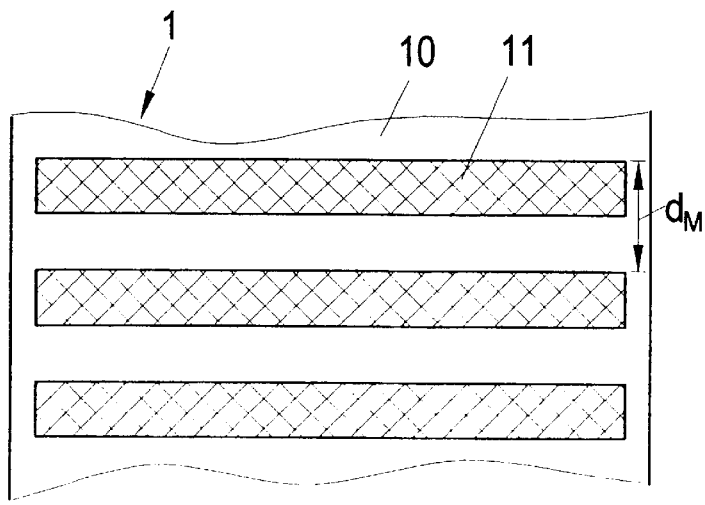

POSITION MEASURING SYSTEM

Applicants claim, under 35 U.S.C. § 119, the benefit of priority of the filing date of Nov. 17, 2000 of a German patent application, copy attached, Ser. No. 100 58 239.7, filed on the aforementioned date, the entire contents of which is incorporated herein by reference.

BACKGROUND OF THE INVENTION

1. Field of the Invention

The present invention relates to a position measuring system, having a graduation support with a measuring graduation which can be scanned by light, having a planar waveguide, by which light generated by a light source is conducted to the measuring graduation, wherein the light is reflected at the surfaces of the planar waveguide, and having a scanning unit for scanning the measuring graduation, which has at least one light-sensitive scanning area to which the light modulated by the measuring graduation is conducted.

2. Discussion of Related Art

An angle measuring device is known from EP 0 589 477 A2, which includes a light source, a disk, which is provided with a measuring graduation and can be connected, fixed against relative rotation, to a shaft to be measured, as well as a photodetector. For realizing the angle measurement, the light coupled out by the light source is initially reflected at a first location on the measuring graduation. Subsequently the reflected light is conducted by a waveguide to another location on the measuring graduation, where it is again reflected and from where it reaches the photodetector.

A photoelectric position measuring device for measuring the relative position of two objects is known from EP 0 426 882 B1, wherein a graduation support with a measuring graduation made of transparent strips and light-reflecting strips is scanned by a scanning unit, which has an illumination unit, a scanning plate with at least one scanning graduation, as well as photodetectors. In this case, the bundle of light rays emanating from the illuminating unit is split into a partial bundle of rays passing through the transparent strips for acting on a first photodetector, and into a partial bundle of rays reflected by the light-reflecting strips for acting on a second photodetector, and the position measuring device is designed in such a way that the partial bundle of rays passing through the measuring graduation is modulated by the scanning graduation, and the partial bundle of rays reflected by the measuring graduation is not modulated by the scanning graduation. A plan-parallel waveguide, which includes the graduation support of the measuring graduation, is provided for conducting the bundle of light beams emanating from the illumination unit to the measuring graduation.

OBJECTS AND SUMMARY OF THE INVENTION

An object of the present invention is based on providing a position measuring system of the type mentioned at the outset, which is distinguished by an improved delivery of the light to the measuring graduation.

In accordance with the present invention, this object is attained by providing a position measuring system that includes a graduation support having a measuring graduation, a planar waveguide and a light source that generates light that is conducted to the measuring graduation, wherein the light is reflected at surfaces of the planar waveguide. A scanning unit for scanning the measuring graduation that includes a light-sensitive scanning area to which light modulated by the measuring graduation is conducted. The modulated light conducted to the light-sensitive scanning area has at least two different light portions, which differ in a number of reflections at the surfaces of the planar waveguide, and wherein the reflecting of the at least two different light portions occurs prior to reaching the measuring graduation.

In accordance therewith the light conducted to the scanning area has at least two different light components, wherein the light of the different components emanates from the waveguide at different locations and differs in the number of reflections which the light beams of the respective light component undergo prior to reaching the measuring graduation in the planar waveguide.

The design in accordance with the present invention of the position measuring system is particularly advantageous in connection with measuring graduations which can be scanned by an incident light method, i.e. which reflect the light conducted to them. If in such a measuring graduation the scanning unit is arranged at a short distance above the graduation support, the problem arises that the scanning unit makes the illumination of the measuring graduation more difficult. In this case it is made possible by the use of a planar waveguide to conduct the light specifically to the measuring graduation. A planar waveguide is understood to be a waveguide having two planar surfaces located opposite each other, at which the light is reflected while it is conducted along the waveguide.

The solution in accordance with the present invention has the advantage that, based on the different number of reflections which different light rays undergo prior to impinging on the measuring graduation, and thereafter on the same scanning area of the scanning unit, the surface section of the plane waveguide through which the light emanates from the waveguide (to finally reach the scanning area) can be considerably larger than that surface section, through which the light is coupled into the waveguide. Because of this, an area of a large surface of the measuring graduation, as well as a corresponding scanning area of the scanning unit can be completely illuminated by the light, even if this light is coupled into the planar waveguide through a comparatively smaller surface section.

The area of the measuring graduation, which is scanned, or illuminated, over a large surface with a different number of previous reflections in the waveguide, is here understood to be a uniform area which provides the same position information. Thus, this does not relate to the illumination of completely separate sections of a graduation support, which are arranged next to each other, such as for example an incremental track on the one side and a reference bar track on the other, but to the scanning of a uniform (incremental or absolute) measuring graduation.

Several analogous, sinusoidal scanning signals which are offset with respect to each other are generated in incremental position measuring systems, namely as a rule four scanning signals, which are each phase-shifted by 90° with respect to each other. These scanning signals are linked together for evaluation. In this regard it is important that they have equal offset portions. This is only assured if all scanning signals are obtained from a common uniform area of the measuring graduation. To compensate for partial contamination of the measuring graduation it is important here that not only one graduation bar of the measuring graduation is a partial component of the generation of each one of the scanning signals, but a plurality of graduation bars, so that they can be averaged. For this reason it is required to illuminate the largest possible scanning area of the measuring graduation which provides a uniform position information, and to derive all scanning signals from this coherent area ("single field scanning").

The measuring graduation of absolute position measuring systems includes a single-track or multi-track coding with code elements, from which a multi-digit code word is formed. During scanning, the code elements required for forming the code word should be illuminated by a common light source, if possible. The illumination of the largest possible uniform area of the measuring graduation, or of the coding which provides the code word characteristic for a defined position in the measuring direction, is therefore also important here.

The coupling element for coupling the light into the waveguide, as well as the coupling element for coupling the light out from the waveguide, can be integrated in a simple manner into the surface of the waveguide, for example in that these coupling elements are stamped as a single-piece component of the waveguide into its surface. A Fresnel grating, or a prism, for example, are suitable for coupling in the light into the planar waveguide.

In accordance with a variation of the present invention, the light rays of the bundle of light rays coupled into the planar waveguide extend parallel with each other in the waveguide. It is thus possible, on the one hand, to provide the light to the waveguide already as a parallel bundle of light rays (i.e. the parallelization of the light takes place outside the waveguide), or the light is parallelized when being coupled into the waveguide, for example by a Fresnel lens, in which the grating constant is spatially varied (off-axis Fresnel lens).

With this variation of the present invention, a respective portion of the light conducted through the waveguide is put out at at least two locations, which are spaced apart in the direction of the extension of the waveguide, wherein the light is reflected in the waveguide at least once between these two locations. By this it is achieved that the light is coupled out of the waveguide with a different number of previous reflections, and can be subsequently supplied first to the measurement graduation, and then to a scanning area. In the course of this, light rays moving along the same track undergo different amounts of reflections in the waveguide before they are coupled out from it.

In accordance with a further variation of the present invention, the light rays extend in the form of a divergent bundle of rays in the planar waveguide. This can be achieved, for example, in that light is coupled into the planar waveguide by a prism, wherein light of different frequencies is deflected at different angles. In this case the light rays extend in the waveguide at different angles with respect to the direction of extension of the waveguide, so that a different number of reflections of different light rays is achieved by this.

In a preferred embodiment of the present invention, the waveguide is arranged between the scanning area of the scanning unit and the graduation support and includes a scanning plate, whose scanning grating works together with the measuring graduation for modulating the light. In this case, the scanning grating can be simultaneously used for coupling out the light from the waveguide.

In another embodiment of the present invention the waveguide includes the graduation support.

In one way the coupling element for coupling light into the wave guide can be provided on the same surface of the waveguide as the coupling element for coupling out the light from the waveguide. Alternatively, the coupling elements for coupling in and coupling out light into the waveguide, or from the waveguide, are arranged on surfaces of the waveguide, which are located opposite each other. In both cases, both surfaces of the waveguide are available for the coupling elements for coupling in and/or for coupling out light.

Preferably the waveguide is made of glass or of a plastic material.

Further components, for example electrical components, can be provided on the surfaces of the planar waveguide, besides optical components, for example in the form of coupling elements for coupling in or coupling out light. These can be arranged, for example by so-called "chip-on-glass" techniques, on the surface of the waveguide. The electrical components can be strip conductors in particular.

Further characteristics and advantages of the invention will become apparent in the course of the following description of exemplary embodiments by the drawings.

BRIEF DESCRIPTION OF THE DRAWINGS

FIG. 4a is a side cross-sectional view of a fourth embodiment of a position measuring system according to the present invention that includes a scale and a scanning unit for scanning the scale;

FIG. 4b is a view from above of an embodiment of a scanning plate of the position measuring system shown in FIG. 4a;

FIG. 4c is a view from above of an embodiment of a scale of the position measuring system shown in FIG. 1;

FIG. 5b is a view from above of an embodiment of a scanning plate of the position measuring system shown in FIG. 5a; and FIG. 5c is a view from above of an embodiment of a scale of the position measuring system shown in FIG. 5a.

DETAILED DESCRIPTION OF THE PREFERRED EMBODIMENTS

Figure 1:
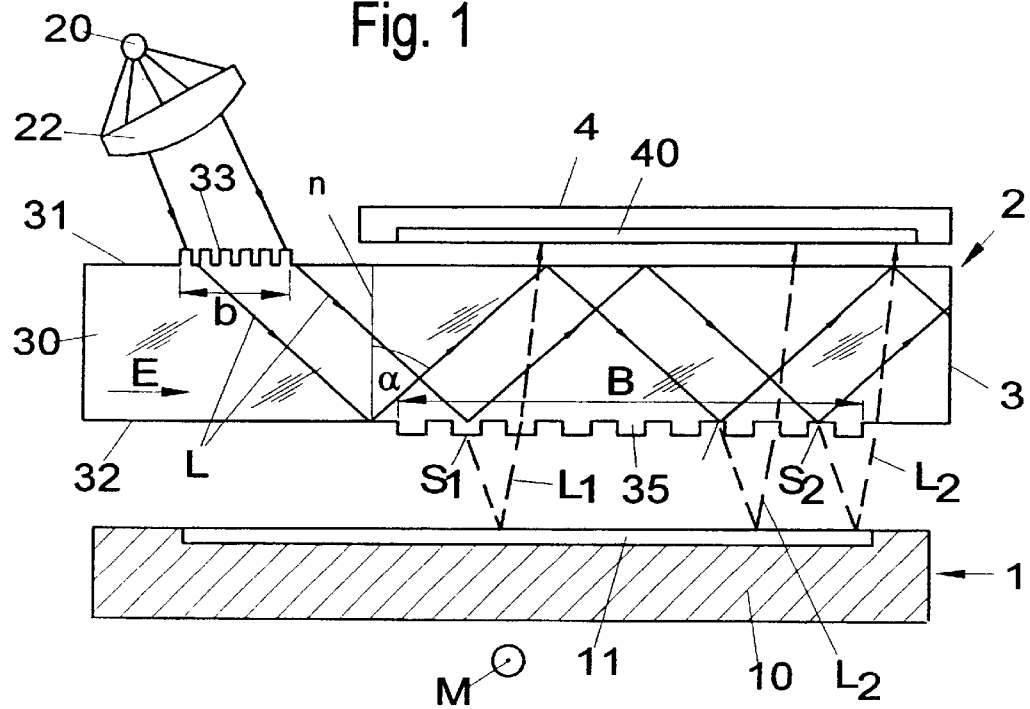
FIG. 1 is a side cross-sectional view of an embodiment of a position measuring system according to the present invention that includes a scale and a scanning unit for scanning the scale.

A position measuring system is represented in FIG. 1, which includes in a known manner a scale 1 and a scanning unit 2 for scanning the scale 1.

The scale 1 includes a graduation support 10, to which a measuring graduation 11, which can be scanned by the incident light method (reflection method) and is made of a highly reflective material, and which can be either an incremental, as well as an absolute measuring graduation. An incremental measuring graduation is the respective basis of what follows.

The scanning unit 2 is used for the optoelectric scanning of the measuring graduation 11 of the scale 1, and to this end includes in a known manner a scanning plate 3, as well as a detector 4. The scanning plate 3 includes a plate-shaped base body 30 with a first flat (planar) surface 31 facing the detector 4, and an oppositely located second flat surface 32 facing the scale 1. A scanning grating 35 is arranged on the second surface 32 of the scanning plate 2 opposite the measuring graduation 11. This scanning grating 35 modulates the light L reflected by the measuring graduation 11 before it reaches the scanning area 40 of the detector 4. The scanning area 40 of the detector 4 includes a photodetector, or an arrangement of several photodetectors (sensor row), which form a coherent uniform scanning area.

The scale 1 and the scanning unit 2 are used for measuring the position of two component groups which are movable in a measuring direction M (perpendicularly to the plane of section in FIG. 1), for example two machine elements. For this purpose, the scale 1 is connected with one of these two machine elements, and the scanning unit 2 with the other machine element.

Here, the measuring graduation 11 is used for delivering a single measured position, which was measured at a defined position in the measuring direction M over respectively its entire length, which can be scanned by the light L, along a direction of extension E perpendicularly with respect to the measuring direction. Thus, the measuring graduation 11 respectively forms a uniform area with incremental or absolute measuring information along the direction of extension E, from which the actual position of the scanning unit 2 in relation to the scale 1 in the measuring direction M can be determined.

In the course of the movement of the scanning unit 2 in relation to the scale 1, the light L conducted to the measuring graduation 11 is modulated in a characteristic manner during the reflection at the measuring graduation 11 and the subsequent passage through the scanning grating 35. The varying light intensity is converted into a corresponding electrical current in the detector 4, from which the relative movement of the scanning unit 2, and of the machine element connected with it, in relation to the scale 1 and the associated other machine element can be determined.

This optoelectrical measuring principle is known and is described, for example in the technical manual "Digitale Langen- und Winkelmeβtechnik" [Digital Linear and Angular Measuring Technology] by Alfons Ernst, LandsbergLech (1998), pages 16 to 27.

A special feature of the position measuring system represented in FIG. 1 lies in that the scanning plate 3, which preferably is 1 mm to 5 mm thick, is simultaneously also used as a planar waveguide, by which the light L emanating from a light source 20 is conducted to the measuring graduation 11 of the scale 1. To this end the light is coupled into the scanning plate 3 made of glass or a plastic material by a Fresnel lens 33. The Fresnel lens 33 includes a grating stamped into the first surface 31 of the scanning plate 3 facing the detector 4. Thus, the Fresnel lens 33 is an integral part of the scanning plate 3 and is formed directly out of its first surface 31.

The introduction of light into the planar waveguide included with the scanning plate 3 takes place in that the parallelized (by a collimator 22 outside of the scanning plate 3) light L is deflected by the Fresnel lens 33 in such a way that it undergoes total reflection inside the scanning plate 3 on the parallel surfaces 31, 32. For total reflection, the angle of the bundle of light in relation to the normal line n on the parallel surfaces 31, 32 (at a refractive index 1.5 of the scanning plate) must be greater than 41°. By this the bundle of light L can be conducted in the direction of extension E of the scanning plate 3 (perpendicularly to the measuring direction M) to the measuring graduation 11 of the scale 1.

The coupling out of the bundle of light L conducted in the scanning plate 3 takes place by the scanning grating 35, which is simultaneously used as coupling-out grating. In the course of this, only a defined portion $L_1$, $L_2$ of the light conducted in the scanning plate 3 is coupled out from the latter at the locations $S_1$, $S_2$, at which the light impinges on the scanning and coupling-out grating 35. The respectively coupled-out light portion $L_1$, $L_2$ is reflected at the measuring graduation 11 of the scale 1 and, following another passage through the scanning and coupling grating 35, impinges on the scanning area 40, defined by the photodetector, of the scanning unit 4.

In this case, light of the zero diffraction order is respectively reflected at the locations $S_1$, $S_2$, i.e. is further conducted in the waveguide, while the light rays of the -1st diffraction order are coupled out and are provided as the light portions $L_1$, $L_2$ to the measuring graduation 11.

The only partial coupling out of individual light portions $L_1$, $L_2$ at the individual locations $S_1$, $S_2$ has as a result that the light portions $L_1$, $L_2$ have undergone a different number of reflections on the surface 31, 32 of the scanning plate 3 prior to being coupled out of it. Thus, a light portion $L_1$ did not undergo a single reflection prior to coupling out, and another light portion $L_2$, $L_3$, a total of two reflections at the surfaces 31, 32 prior to coupling out.

The coupling-out efficiency of the coupling-out grating advantageously varies as a function of the location of coupling out in the direction of extension E of the scanning plate 3. This is achieved by a variation of the structure of the grating period, such as step height and/or bar width. The coupling out efficiency should increase in the direction of extension E, so that less light is coupled out at the beginning, and at the end a larger portion of the light still available after several reflections. It can even be provided here that at the end of the scanning plate 3 (viewed in its direction of extension E), all of the light is coupled out and conducted to the measuring graduation 11, as well as subsequently to the scanning area 40. This applies correspondingly also to the exemplary embodiments represented in what follows.

By this it is achieved that the width B of the surface section, through which the bundle of rays L conducted in the scanning plate 3 is coupled out of the scanning plate 3 (and therefore the width of the illuminated surface of the measuring graduation 11 and of the scanning area 40), can be considerably larger than the so-called entry aperture, i.e. the width b of the surface section of the scanning plate 3 through which the light L is coupled into the scanning plate 3 (width of the Fresnel lens 33). In this way it is easily possible in connection with a scanning plate 3 to achieve, starting with a width b of the entry aperture of approximately 2 mm, a width B of the surface through which the bundle of light L is coupled out, of approximately 5 mm. This leads to the ability of illuminating a correspondingly increased surface of the measuring graduation 11, and therefore also of the scanning area 40 transversely to the measuring direction M.

The position measuring system can therefore be equipped with a comparatively compact illumination arrangement and optical illumination device, which is used for supplying light to the planar waveguide (scanning plate 3) and for coupling the light into the waveguide.

Figure 2:
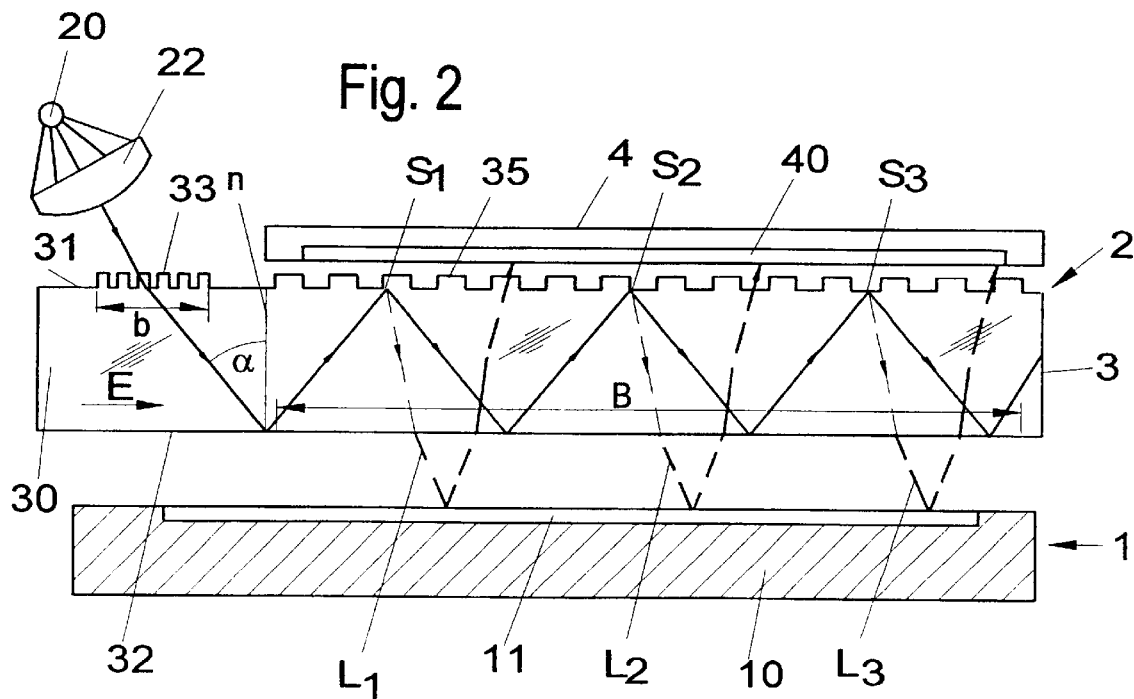
FIG. 2 is a side cross-sectional view of a second embodiment of a position measuring system according to the present invention that includes a scale and a scanning unit for scanning the scale.

A variation of the exemplary embodiment in FIG. 1 is represented in FIG. 2, wherein the sole structural difference rests in that the scanning and coupling-out grating 35 has been stamped into the surface 31 of the scanning plate 3 facing the detector 4. Moreover, a total of three light portions $L_1$, $L_2$, $L_3$ with a different number of reflections prior to coupling out are represented in FIG. 2. Otherwise the position measuring systems represented in FIGS. 1 and 2 agree, which is indicated by the use of identical reference symbols in the drawing figures.

Here, too, the light of zero diffraction order is respectively reflected at the locations $S_1$, $S_2$, $S_3$, i.e. continued to be conducted in the waveguide, while the light rays of the -1st order of diffraction are coupled out and are supplied as light portions $L_1$, $L_2$, $L_3$ to the measuring graduation 11.

The present invention can also be employed in position measuring systems in which the coupling-out grating represented in FIGS. 1 and 2 does not perform the function of a scanning grating. In position measuring systems of this type the light directed from the coupling-out grating 35 to the measuring graduation 11 is modulated as a function of the position, and a light pattern is created in the detector plane 40. In this case the scanning grating is provided at the detector 4 in that a screen is applied to its light-sensitive surface, or in that the light-sensitive areas themselves are embodied to be structured in a known manner. In all cases the measuring graduation 11 can be an amplitude grating or a phase grating.

Figure 3A:
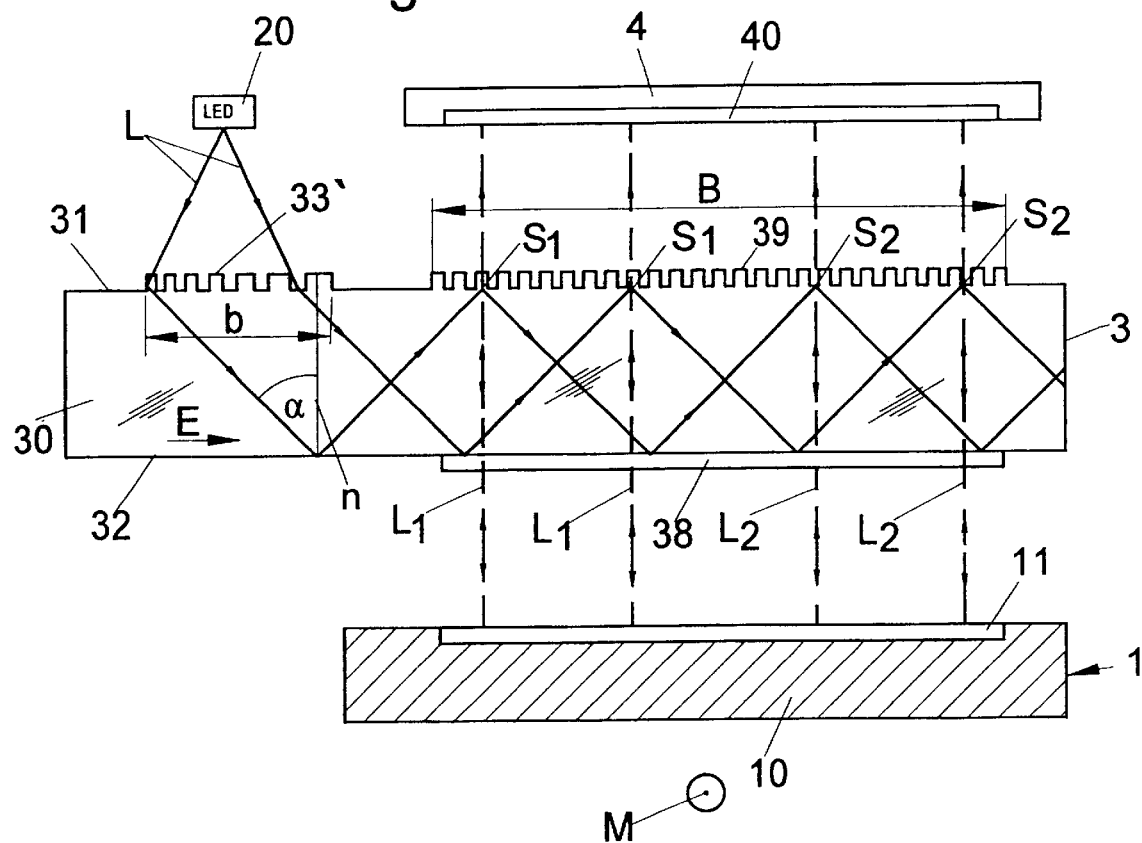
FIG. 3a is a side cross-sectional view of a third embodiment of a position measuring system according to the present invention that includes a scale and a scanning unit for scanning the scale.
Figure 3B:
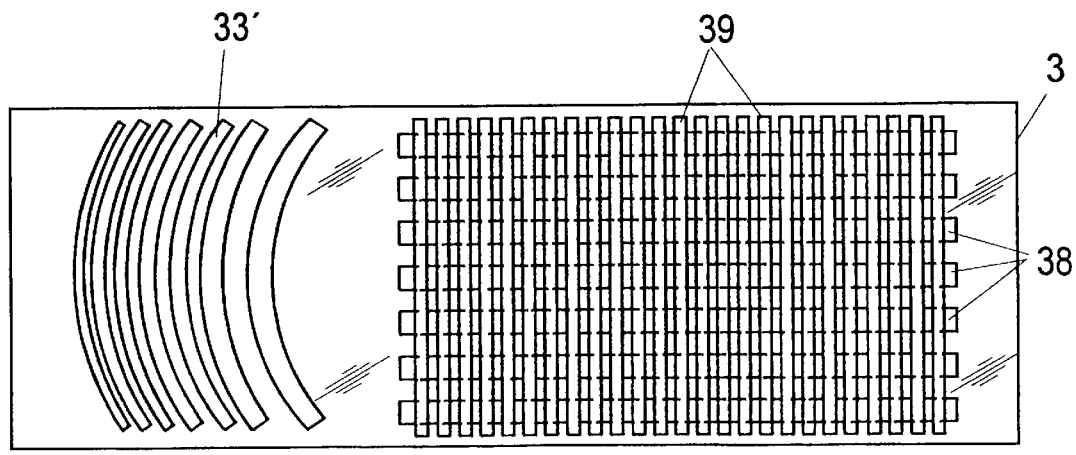
FIG. 3b is a view from above of an embodiment of a scanning plate of the position measuring system shown in FIG. 3a, used as a waveguide.

The position measuring system represented in FIGS. 3a and 3b differs from the one represented in FIGS. 1 and 2 for one in that here the light coming from the light source 20 (LED) is only parallelized when being coupled into the scanning plate 3. A so-called off-axis Fresnel lens 33' is used for this, wherein the width of the individual grating elements, as well as their distance, varies spatially. This Fresnel lens 3' has a curved grating (see FIG. 3b), wherein the curvature of the grating generates its collimating effect, and wherein the local grating constant determines the diffraction angle and thus causes the coupling-in of the light into the scanning plate 3 used as a waveguide (creation of total reflection on the surfaces 31, 32).

Furthermore, in the position measuring system represented in FIGS. 3a and 3b the scanning grating 38 of the scanning plate 3, which acts together with the measuring graduation 11 for modulating the light, on the one hand and, on the other, the coupling-out grating 39, which is used for coupling light out of the scanning plate 3, are arranged separately on oppositely located surfaces of the scanning plate 3. Here, the scanning grating 38 is provided on the surface 32 of the scanning plate 3 facing the scale 1. On the other hand, the coupling-out grating 39 with a phase depth of 180° is stamped into the surface 31 of the scanning plate 3 facing the detector 4.

In this case the scanning grating 38 is embodied as an incremental scanning grating (amplitude grating) and is adapted to the use of an incremental track as the measuring graduation 11. The graduation bars of the scanning grating 38 extend parallel with the graduation bars of the measuring graduation 11.

The position measuring system represented in FIGS. 4a to 4c is a variation of the exemplary embodiment represented in FIGS. 3a and 3b. In this case, the off-axis Fresnel lens 33' provided for coupling in the light bundle L, as well as for parallelizing this light bundle, has been stamped into the surface 32 of the scanning plate 3 facing the scale 1. If required, this Fresnel lens 33'— as indicated in FIG. 4a by a dashed line V— can be reflectorized.

In this case, a grating 36 is used as the scanning and coupling-out grating, which can be seen in detail in the view from above on the scanning plate 3 in accordance with FIG. 4b. The combined scanning and coupling-out grating is embodied as a transverse grating with graduation bars extending perpendicularly to the graduation bars of the measuring graduation 11 (see FIGS. 4b and 4c). Again, the graduation bars of the combined scanning and coupling-out grating 36 are arranged in several adjoining tracks 36a, 36b, wherein the individual tracks 36a, 36b extend parallel with the graduation bars of the measuring graduation 11. The tracks 36a, 36b located next to each other are here respectively offset with respect to each other by a quarter of their period $d_T$. The width $d_A$ of two adjoining tracks of the scanning and coupling-out grating 36 corresponds to the period $d_M$ of the measuring graduation 11. Further details regarding the structure and functioning of such a scanning grating can be taken from EP 0 735 346 A2.

The phase, but not the intensity, of the coupled-out light along the measuring direction is modulated by the offset of the adjoining tracks. Therefore such a scanning and coupling-out grating acts like a conventional phase scanning grating. The effective phase depth of such a phase grating can be set as desired by the displacement of the tracks perpendicularly to the measuring direction.

The distance D between the scanning grating 3 and the scale 1 is on an order of magnitude of $D=d_A^2/(2*1)$, wherein 1 is the wavelength of the light. Then the distance D is typically 200 $\mu$m to 800 $\mu$m.

In accordance with FIG. 4a, strip conductors 5 have been applied to the surface 31 of the scanning plate 3 facing the detector 4 by the so-called "chip-on-glass" technique. These strip conductors are in contact via "bumps" 50 with the electrical components of the detector 4. By this, the surface 31 of the scanning plate 3 can be simultaneously used for connecting the detector 4 electrically.

Figure 5A:
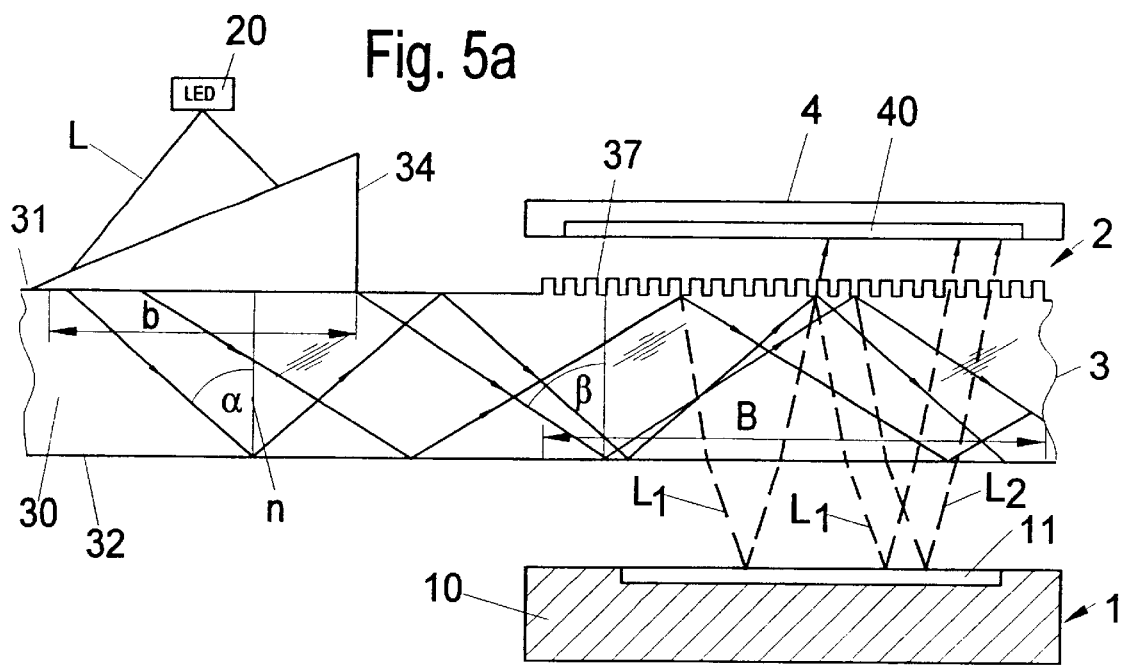
FIG. 5a is a side cross-sectional view of a fifth embodiment of a position measuring system according to the present invention that includes a scale and a scanning unit for scanning the scale.
Figure 5B:
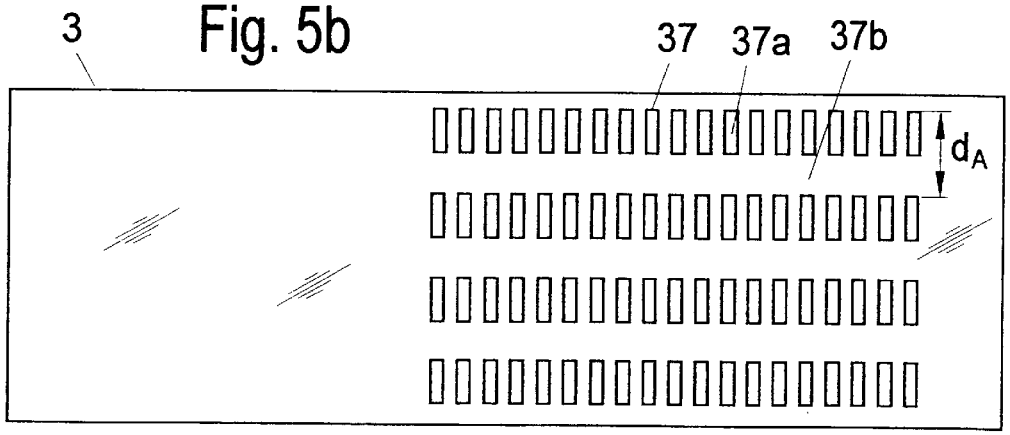
Figure 5C:
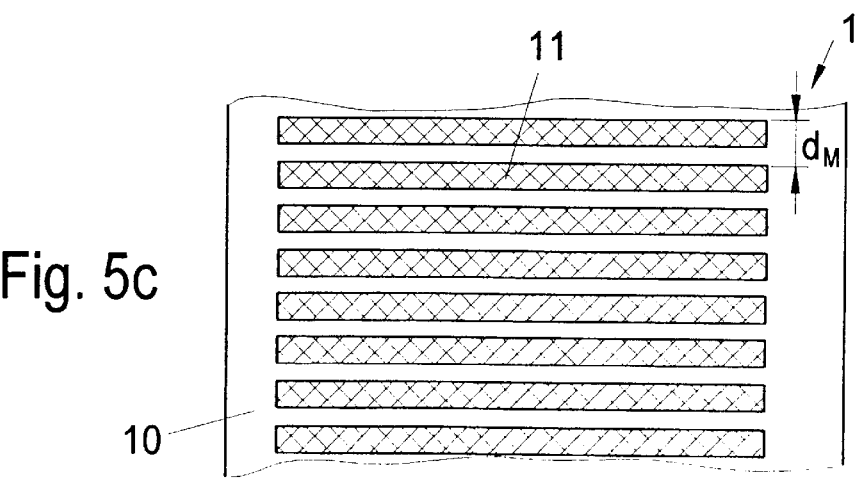

A prism 34 provided on the surface 31 of the scanning plate 3 facing the detector 4 is used for coupling the light L into the scanning plate 3 functioning as a planar waveguide in the exemplary embodiment represented in FIGS. 5a to 5c. The bundle of light L emitted by the light source 20 is coupled into the scanning plate 3 as a divergent bundle of light by this prism 34, i.e. the bundle of light L passed along in the scanning plate 3 has light portions of a different inclination with respect to the surfaces 31, 32 of the scanning plate 3. Expressed in different terms, the light rays which are part of the different light portions are respectively reflected at different reflection angles by the surfaces 31, 32. By this, too, it is possible to achieve that the light rays of different light portions $L_1$, $L_2$ undergo a different number of reflections at the surfaces 31, 32 of the scanning plate 3 before they are coupled out of the waveguide (scanning plate 3). Here, the light rays with different angles with respect to the surfaces 31, 32 differ with respect to their frequency.

Again, a combined scanning and coupling-out grating 37 is used here for coupling-out, which has been matched in its shape to the use of the divergent light for scanning the measuring grating 11. As in the exemplary embodiment represented in FIGS. 4a to 4c, the scanning and coupling-out grating 37 is here also embodied as a transverse grating, whose graduation bars extend perpendicularly to the graduation bars of the measuring graduation 11 (see FIGS. 5b and 5c).

The graduation bars of the scanning and coupling-out grating 37 are here combined into tracks 37a, which extend next to each other and respectively parallel with the graduation bars of the measuring graduation 11. In contrast to the exemplary embodiment in FIGS. 4a to 4c, here there is a gap 37b, in which no coupling-out of light takes place, between adjacently located tracks 37a of the grating 37. Therefore the intensity of the respectively coupled-out light is modulated along the measuring direction. Thus, such a combined coupling-out and scanning grating corresponds to a conventional amplitude grating. The thickness $d_A$ of each one of the tracks 37a, together with the respectively adjoining gap 37b, here corresponds to twice the period $d_M$ of the measuring graduation 11; therefore $d_A=2*d_M$. The measuring method on which this is based is described in SPIE, vol. 136, 1977, on pages 325 to 333.

If, in place of a scale with an incremental measuring graduation, a scale with an absolute measuring graduation is used, a CCD line is preferably assigned to the latter as the scanning unit. No scanning structure (scanning graduation) is required with such an arrangement, so that the waveguide contains only a coupling-out grating. It is alternatively possible to use the scale itself as a waveguide.

It is possible with all exemplary embodiments to achieve the propagation of a bundle of light in the scanning grating 3 used as a waveguide also.by a partial reflectorizing of the surfaces 31, 32, besides the generation of a total reflection.

The foregoing description is provided to illustrate the invention, and is not to be construed as a limitation. Numerous additions, substitutions and other changes can be made to the invention without departing from its scope as set forth in the appended claims.

We claim:

1. A position measuring system, comprising:
   a graduation support comprising a measuring graduation;
   a planar waveguide;
   a light source that generates light that is conducted to said measuring graduation, wherein said light is reflected at surfaces of said planar waveguide; and
   a scanning unit for scanning said measuring graduation, said scanning unit comprising a light-sensitive scanning area to which light modulated by said measuring graduation is conducted, wherein said modulated light conducted to said light-sensitive scanning area comprises at least two different light portions, which differ in a number of reflections at said surfaces of said planar waveguide, and wherein said reflecting of said at least two different light portions occurs prior to reaching said measuring graduation.

2. The position measuring system in accordance with claim 1, further comprising a coupling element for coupling-in said light into said waveguide that is provided on at least one surface of said waveguide.

3. The position measuring system in accordance with claim 2, further comprising a second coupling element for coupling-out said light out of said waveguide that is provided on at least one surface of said waveguide.

4. The position measuring system in accordance with claim 3, wherein said first coupling element and said second coupling element are integral with said waveguide.

5. The position measuring system in accordance with claim 4, wherein said first coupling element and said second coupling element are stamped into at least one surface of said waveguide.

6. The position measuring system in accordance with claim 1, wherein light rays extend parallel with each other in said planar waveguide.

7. The position measuring system in accordance with claim 6, wherein said light is supplied to said waveguide in the form of a parallelized bundle of light.

8. The position measuring system in accordance with claim 7, wherein said light is parallelized in the course of being coupled into said waveguide.

9. The position measuring system in accordance with claim 8, wherein said light is coupled into said planar waveguide by an off-axis Fresnel lens.

10. The position measuring system in accordance with claim 1, wherein light rays extend in the form of a divergent bundle of rays in said planar waveguide.

11. The position measuring system in accordance with claim 10, wherein said light is coupled into said planar waveguide by a prism.

12. The position measuring system in accordance with claim 11, wherein said light rays extend in said waveguide at different angles in relation to a direction extension of said waveguide.

13. The position measuring system in accordance with claim 10, wherein said light rays extend in said waveguide at different angles in relation to a direction of extension of said waveguide.

14. The position measuring system in accordance with claim 1, wherein said waveguide is arranged between said light sensitive scanning area and said graduation support.

15. The position measuring system in accordance with claim 14, wherein said waveguide comprises a scanning plate, which comprises a scanning grating.

16. The position measuring system in accordance with claim 15, wherein said scanning grating is simultaneously used for coupling said light out of said waveguide.

17. The position measuring system in accordance with claim 1, wherein said measuring graduation is scanned in accordance with an incident light method.

18. The position measuring system in accordance with claim 17, wherein said planar waveguide comprises:
   a first surface section through which said light is coupled into said waveguide; and
   a second surface section through which said light is coupled out of said waveguide.

19. The position measuring system in accordance with claim 1, wherein said planar waveguide comprises:
   a first surface section through which said light is coupled into said waveguide; and
   a second surface section through which said light is coupled out of said waveguide.

20. The position measuring system in accordance with claim 19, wherein said second surface section has a width as measured in a direction of extension of said waveguide that is greater than a width of said first surface section as measured in said direction of extension.

21. The position measuring system in accordance with claim 1, wherein said light is coupled into said waveguide by a Fresnel lens.

22. The position measuring system in accordance with claim 21, wherein said light is coupled into said planar waveguide by an off-axis Fresnel lens.

23. The position measuring system in accordance with claim 1, further comprising a coupling element for coupling-out said light out of said waveguide that is provided on at least one surface of said waveguide.

24. The position measuring system in accordance with claim 1, wherein a respective portion of said light conducted through said waveguide is put out at at least two locations, which are spaced apart in a direction of extension of said waveguide, wherein said light is reflected in said waveguide at least once between said at least two locations.

25. The position measuring system in accordance with claim 1, wherein said waveguide is incorporated with said graduation support.

26. The position measuring system in accordance with claim 1, further comprising:
   a first coupling element for coupling said light into said waveguide is provided on a surface of said waveguide; and
   a second coupling element for coupling said light out of said waveguide is provided on said surface of said waveguide.

27. The position measuring system in accordance with claim 1, further comprising:
   a first coupling element for coupling said light into said waveguide is provided on a first surface of said waveguide; and
   a second coupling element for coupling said light out of said waveguide is provided on a second surface of said waveguide.

28. The position measuring system in accordance with claim 1, wherein said waveguide is made of glass.

29. The position measuring system in accordance with claim 1, wherein said waveguide is made of a plastic material.

30. The position measuring system in accordance with claim 1, wherein an electrical component is applied to a surface of said waveguide.

* * * * *

UNITED STATES PATENT AND TRADEMARK OFFICE
CERTIFICATE OF CORRECTION

PATENT NO.   : 6,526,190 B2  Page 1 of 1
DATED        : February 25, 2003
INVENTOR(S)  : Wolfgang Holzapfel et al.

It is certified that error appears in the above-identified patent and that said Letters Patent is hereby corrected as shown below:

<u>Column 10,</u>
Line 21, after "to a direction" insert -- of --.

Signed and Sealed this

Nineteenth Day of August, 2003

JAMES E. ROGAN
*Director of the United States Patent and Trademark Office*